(12) United States Patent
Taylor et al.

(10) Patent No.: US 9,776,595 B2
(45) Date of Patent: Oct. 3, 2017

(54) SOFT CLOSE SAFETY BELT TONGUE/LATCH PLATE STOWAGE COMPARTMENT

(71) Applicant: FORD GLOBAL TECHNOLOGIES, LLC, Dearborn, MI (US)

(72) Inventors: Daniel Robert Taylor, Grosse Ile, MI (US); Paul Tuomisto, Grosse Ile, MI (US); Christopher Donald Schop, Chelsea, MI (US); Benjamin Yilma, Canton, MI (US); Travis Justin Raines, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 202 days.

(21) Appl. No.: 14/735,175

(22) Filed: Jun. 10, 2015

(65) Prior Publication Data

US 2016/0362083 A1    Dec. 15, 2016

(51) Int. Cl.
*B60R 22/00* (2006.01)
*B60R 22/12* (2006.01)
*B60R 22/02* (2006.01)

(52) U.S. Cl.
CPC .............. *B60R 22/12* (2013.01); *B60R 22/02* (2013.01); *B60R 2022/021* (2013.01); *B60R 2022/029* (2013.01)

(58) Field of Classification Search
CPC ........................... B60R 22/12; B60R 2022/029
(Continued)

(56) References Cited

U.S. PATENT DOCUMENTS 4,531,762 A * 7/1985 Sasaki ..................... B60R 22/03
                                                      280/801.1
5,957,499 A    9/1999 Kempf
(Continued)

FOREIGN PATENT DOCUMENTS

CN    203358522 U    12/2013
JP    2004330803 A   11/2004
(Continued)

OTHER PUBLICATIONS

English machine translation for CN203358522.
(Continued)

*Primary Examiner* — Toan To
(74) *Attorney, Agent, or Firm* — Vichit Chea; King & Schickli, PLLC (57) ABSTRACT

A vehicle safety belt webbing and tongue/latch plate stowage assembly includes a safety belt webbing retractor disposed in a compartment and a pocket disposed adjacent to the compartment and configured for receiving the safety belt tongue/latch plate therein. The pocket is defined by at least a divider and a door configured for translation between an open configuration and a closed configuration. The closed configuration defines a gap between the wall and the door sufficient for passage therethrough of a safety belt webbing. A damper controls the rate of translation of the door between the open configuration and the closed configuration, providing a soft touch opening/closing feature. The door may be configured for pivoting between the open and closed configurations, or for sliding between the open and closed configurations.

12 Claims, 7 Drawing Sheets

(58) Field of Classification Search
USPC .................................... 280/801.1, 805, 807
See application file for complete search history.

(56) References Cited

U.S. PATENT DOCUMENTS

| | | | |
|---|---|---|---|
| 6,568,032 B1 * | 5/2003 | Ramsauer | E05D 11/1078 16/329 |
| 6,986,188 B2 * | 1/2006 | Lu | G06F 1/1616 16/263 |
| 7,062,817 B2 * | 6/2006 | Lee | E05D 7/1005 16/303 |
| 8,366,191 B2 | 2/2013 | Parker | |
| 2003/0093873 A1 * | 5/2003 | Linnenbrink | E05D 11/081 16/85 |
| 2015/0296928 A1 * | 10/2015 | Krauss | B60Q 3/004 362/549 |
| 2016/0214565 A1 * | 7/2016 | Bell | B60R 22/024 |

FOREIGN PATENT DOCUMENTS

| | | |
|---|---|---|
| JP | 3809938 B2 | 8/2006 |
| JP | 2011195064 A | 10/2011 |
| JP | 4985228 B2 | 7/2012 |
| JP | 2012224253 A | 11/2012 |
| JP | 5553143 B2 | 7/2014 |
| JP | 5601636 B2 | 10/2014 |

OTHER PUBLICATIONS

English machine translation for JP3809938.
English machine translation for JP4985228.
English machine translation for JP5553143.
English machine translation for JP5601636.
English machine translation for JP2004330803.
English machine translation for JP2011195064.
English machine translation for JP2012224253.

* cited by examiner

SOFT CLOSE SAFETY BELT TONGUE/LATCH PLATE STOWAGE COMPARTMENT

TECHNICAL FIELD

This disclosure relates generally to vehicle safety belts. More particularly, the disclosure relates to a stowage compartment for a safety belt tongue/latch plate, the compartment including a self-closing/soft-close feature.

BACKGROUND

Three main systems for stowage of vehicle safety belts are known. These are roof-mounted systems, pillar-mounted systems, and parcel tray-mounted systems (primarily in sedans). In such systems, typically a safety belt webbing retractor of known design is hidden in the vehicle roof trim, pillar trim, or parcel tray trim, and the safety belt tongue and latch plate simply hang free when the safety belt webbing is fully retracted. Alternatively, a slot may be provided in a bezel adjacent to the webbing retractor for holding the safety belt tongue/latch plate. Such systems detract from the overall aesthetic appearance of the vehicle interior, since the safety belt tongue/latch plates are constantly visible. Moreover, conventional stowage pockets for safety belt tongues/latch plates remain open and visible when the safety belt is in use, further detracting from the vehicle interior fit and finish and providing an attractive, crafted appearance.

To solve this and other problems, the present disclosure relates to a soft close safety belt tongue stowage compartment providing concealment of the safety belt tongue when not in use.

SUMMARY

In accordance with the purposes and benefits described herein, in one aspect a concealing stowage compartment for a vehicle safety belt tongue/latch plate is described. The compartment includes a pocket configured for receiving the safety belt tongue/latch plate therein, the pocket defined by at least a wall and a door configured for translation between an open configuration and a closed configuration. The closed configuration defines a gap between the wall and the door sufficient for passage therethrough of a safety belt webbing, allowing a crafted appearance for the compartment even when the safety belt is in use and the door is closed.

In embodiments, the door includes a damper for controlling a rate of translation of the door between the open configuration and the closed configuration and a catch for engaging the safety belt tongue/latch plate to translate the door to the closed configuration. The door may be configured for pivoting between the open and closed configurations, or for sliding translation between the open and closed configurations. In the pivoting embodiment, the door includes a hinged end. A spring-assisted mechanism may be provided for assisting in translating the door between the closed configuration and the open configuration.

In another aspect, a vehicle safety belt webbing and tongue/latch plate stowage assembly is described, including a safety belt webbing retractor disposed in a compartment and a pocket as described above adjacent to the compartment. In embodiments, the compartment may be disposed in a portion of the vehicle roof trim. In other embodiments, the compartment may be disposed in a vehicle parcel tray.

In the following description, there are shown and described embodiments of the disclosed soft close safety belt tongue/latch plate stowage compartment. As it should be realized, the compartment is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed soft close safety belt tongue/latch plate stowage compartment, and together with the description serve to explain certain principles thereof. In the drawing.

Reference will now be made in detail to embodiments of the disclosed soft close safety belt tongue/latch plate stowage compartment, examples of which are illustrated in the accompanying drawing figures.

DETAILED DESCRIPTION

Figure 1A:
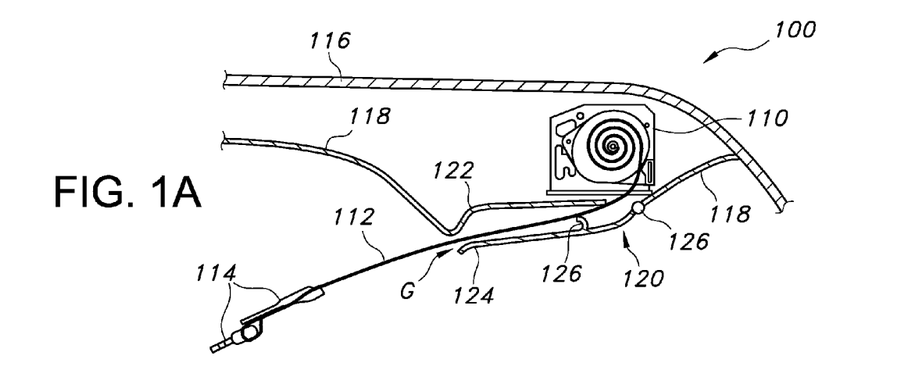
FIG. 1A depicts a side view of a roof-mount safety belt stowage compartment according to the present disclosure having a door held in a closed configuration with the safety belt deployed.
Figure 1B:
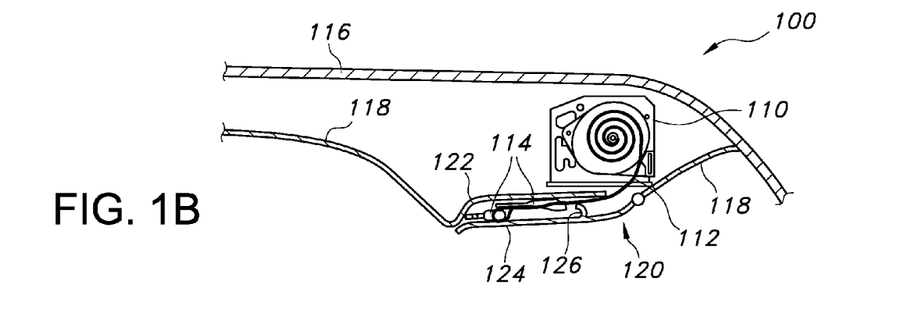
FIG. 1B depicts the compartment of FIG. 1A with the door in a closed configuration with the safety belt webbing and tongue/latch plate stowed.
Figure 1C:
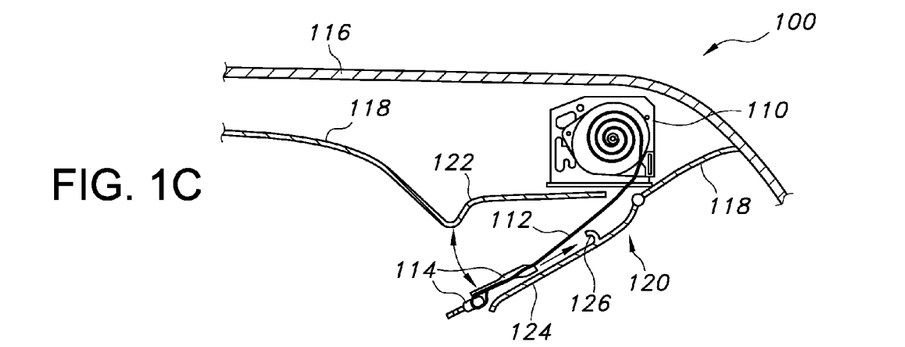
FIG. 1C depicts the compartment of FIG. 1A with the door in an open configuration.

Turning to FIGS. 1A-1C, a soft close safety belt tongue/latch plate stowage assembly 100 is depicted. The assembly 100 includes a seat belt webbing retractor 110 which, as is known in the art, is configured to deploy and retract a seat belt having a seat belt webbing 112 and at least one tongue/latch plate 114. The basic design and operation of such webbing retractors 110 are well known in the art and do not require extensive discussion herein, but at a high level include a rotational reel for automatically retracting and spooling seat belt webbing for storage. In the depicted embodiment, the assembly is roof-mounted, i.e. the retractor 110 is disposed in a portion of a roof trim of a vehicle (not shown). As shown, the retractor 110 is positioned between a roof metal panel 116 and a roof trim panel 118.

The assembly 100 further includes a safety belt tongue stowage pocket 120, defined by a wall 122 and a door 124. As shown, wall 122 is provided by a portion of the vehicle roof trim panel 118, although of course a separate structure could be provided as wall 122. As shown, door 124 is configured for pivoting between an open configuration (FIG. 1C) and a closed configuration (FIG. 1B). A gap G is provided between the door 124 and the wall 122 even when the door 124 is in the closed configuration, the gap G being configured to be sufficient for passage of a safety belt webbing 112 therethrough. This allows deployment of the safety belt webbing 112 and tongue 114 during use while maintaining an appearance of a closed door 124 (see FIG. 1A), providing a more attractive aesthetic appearance and crafted finish than conventional roof-mount mechanisms which typically expose the inner mechanisms thereof and/or the safety belt tongue/latch plates.

In the depicted embodiment, door 124 is pivotally mounted for translating between the open, intermediate, and closed configurations by a hinge 126 optionally having a spring mechanism for assisting in translating the door between the open and closed configurations and a damper. As shown in FIGS. 1A-1C, door 124 may pivot in a rearward direction relative to the vehicle longitudinal axis. Suitable spring mechanisms include torsion springs configured to bias the door 124 to or from the closed configuration, such mechanisms being well known in the art. Door 124 may also include a catch 126 configured to engage a portion of safety belt tongue/latch plate 114 (see FIG. 1C) as it retracts, and so to bias door 124 to the closed configuration (see FIG. 1B).

As is also well known, dampers control a rate/speed of opening/closing mechanisms of doors associated with vehicle features such as compartment covers, console storage bin covers/lids, etc. Examples of suitable dampers for use with the presently disclosed assembly include damping struts, damping gears, and the like. Such mechanisms are well known in the vehicle arts, and do not require extensive discussion herein. In turn, door 124 may be provided with a closure mechanism (not shown), which may be a simple catch or lock, or a more complex mechanism such as a push-push lock, etc.

As will be appreciated, the described features of spring-assist mechanisms and dampers provide an easy opening, soft-closing mechanism for conveniently opening and closing the door 124. In turn, catch 128 provides a convenient self-closing feature for the assembly 100.

Figure 2A:
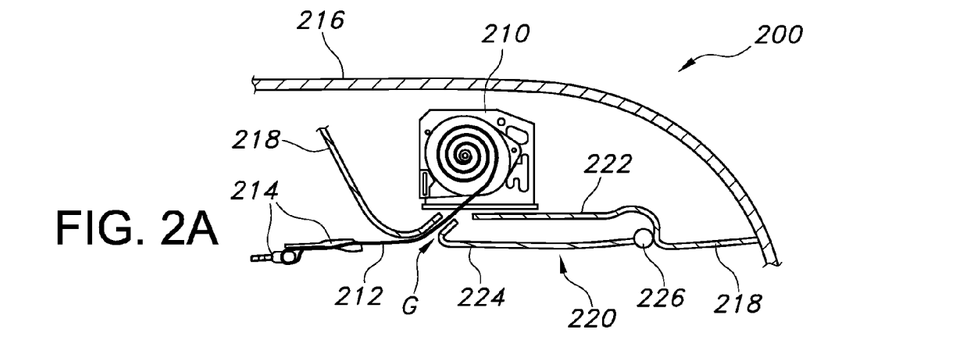
FIG. 2A depicts a side view of an alternative embodiment of a roof-mount safety belt stowage compartment according to the present disclosure with the safety belt webbing and tongue/latch plate deployed and the door in a closed configuration.
Figure 2B:
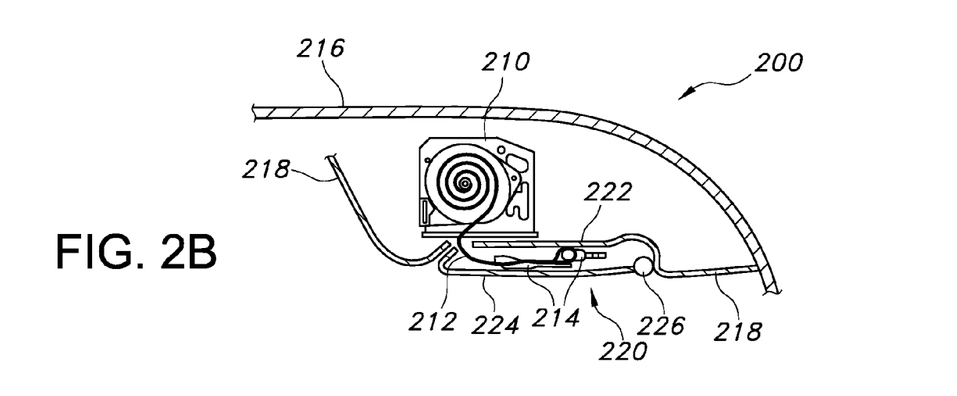
FIG. 2B depicts the compartment of FIG. 2A with the safety belt webbing and tongue/latch plate stowed and the door in a closed configuration.
Figure 2C:
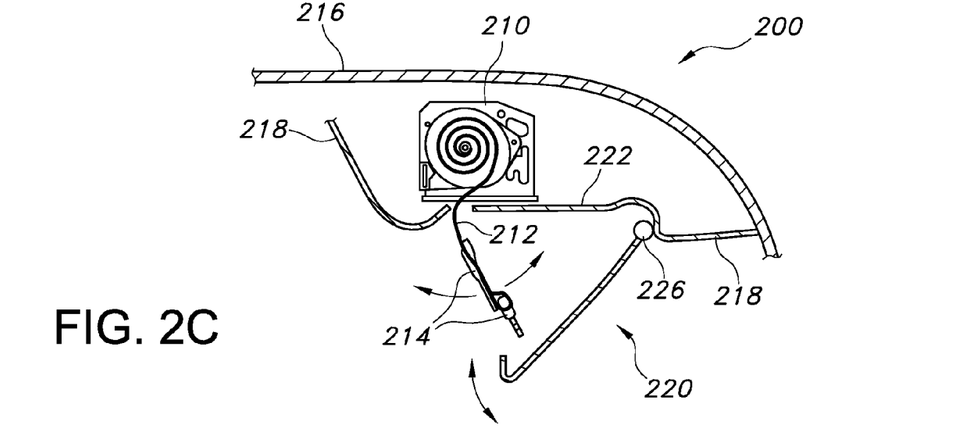
FIG. 2C depicts the compartment of FIG. 2A with the safety belt webbing and tongue/latch plate deploying and the door in an open configuration.

In an alternative embodiment of a roof-mounted assembly 200 (see FIGS. 2A-2C), a soft close safety belt tongue stowage assembly 200 is depicted, substantially similar to that of FIGS. 1A-1C. In this alternative embodiment, door 224 is configured for rearward pivoting much as described above. As shown, on reaching a limit of retraction of retractor 210, safety belt tongue/latch plate 214 and a small portion of webbing 224 may be swung rearwardly and upwardly for storage in pocket 220 by closing door 224. Alternatively, an optional retainer (not shown) for tongue/latch plate 214 may be provided to keep the tongue/latch plate in place while door 224 is closed. In yet another alternative, one or both of safety belt tongue/latch plate 214 and/or wall 222 may include a magnetic retainer (not shown) whereby tongue/latch plate 214 adheres to a portion of wall 222 on reaching a limit of retraction of retractor 210. Once tongue/latch plate 214 has been secured to wall 222, door 224 may be closed. As non-limiting examples, tongue/latch plate 214 may include a magnet or have a portion thereof magnetized, and wall 222 may include a metal plate for engaging the magnet. Alternatively, wall 222 may include a magnet or have a portion thereof magnetized, for engaging the metal of tongue/latch plate 214. Other features of the assembly 200 are substantially as described above.

Figure 3A:
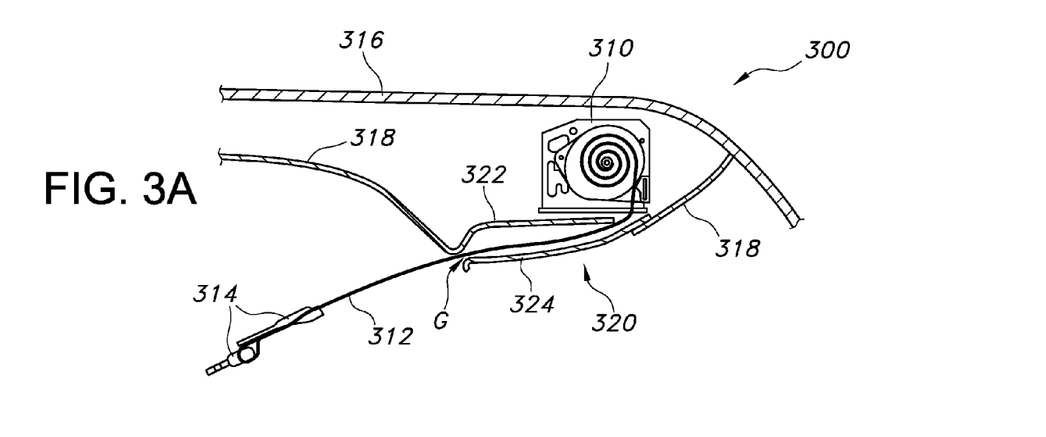
FIG. 3A depicts a side view of another alternative embodiment of a roof-mount safety belt stowage compartment according to the present disclosure with the safety belt webbing and tongue/latch plate deployed and the door in a closed configuration.
Figure 3B:
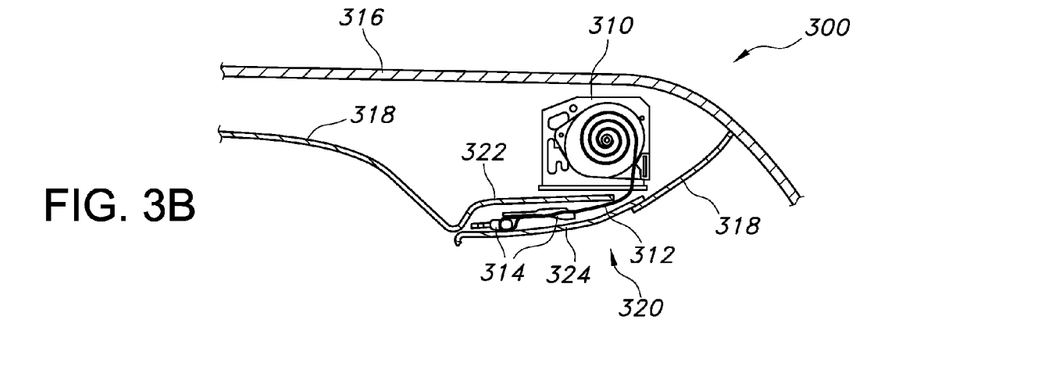
FIG. 3B depicts the compartment of FIG. 3A with the safety belt webbing and tongue/latch plate stowed and the door in a closed configuration.
Figure 3C:
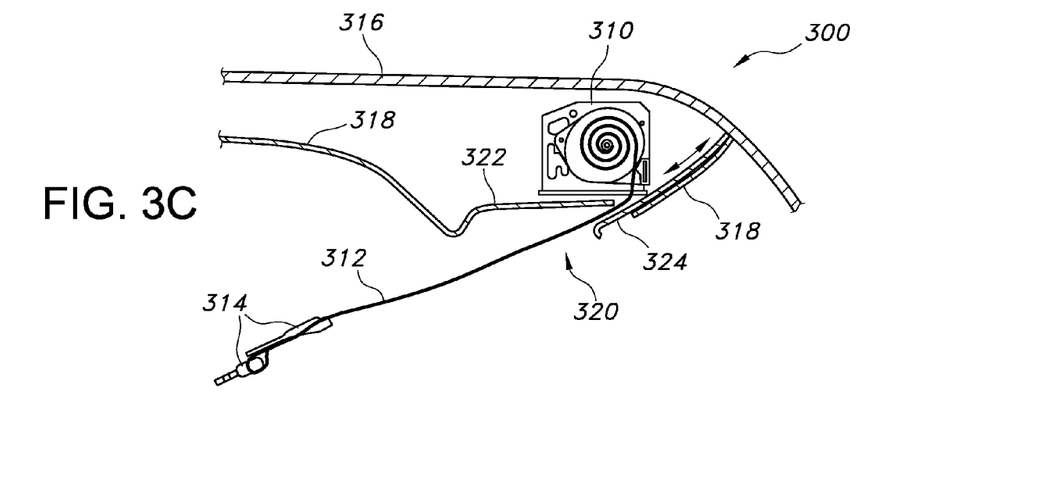
FIG. 3C depicts the compartment of FIG. 3A with the safety belt webbing and tongue/latch plate deployed and the door in an open configuration.

In another embodiment of a roof-mounted assembly 300 (see FIGS. 3A-3C), door 324 is configured for slidingly translating between the open (FIG. 3C) and closed (FIG. 3A) configurations. This may be accomplished by providing one or more cooperating tracks (not shown) in which door 324 may slide in a fore-and-aft direction (see arrows in FIG. 3C). Alternatively, door 324 may be provided with integral or associated rails (not shown) that are received in cooperating guides (not shown) in or on roof trim 318. In the embodiment of FIGS. 3A-3C, on reaching a limit of retraction of retractor 310, tongue/latch plate 314 and a portion of webbing 312 are disposed in pocket 320, and door 324 may be closed.

Figure 4A:
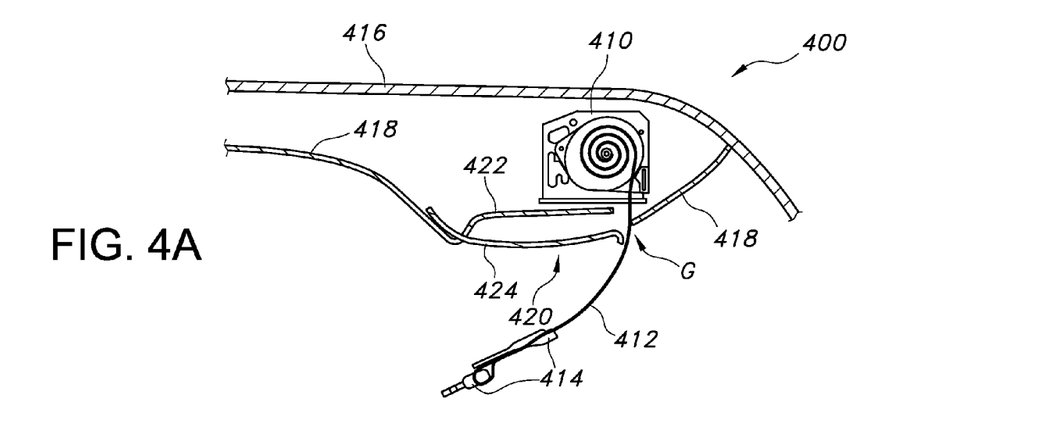
FIG. 4A depicts a side view of yet another alternative embodiment of a roof-mount safety belt stowage compartment according to the present disclosure with the safety belt webbing and tongue/latch plate deployed and the door in a closed configuration.
Figure 4B:
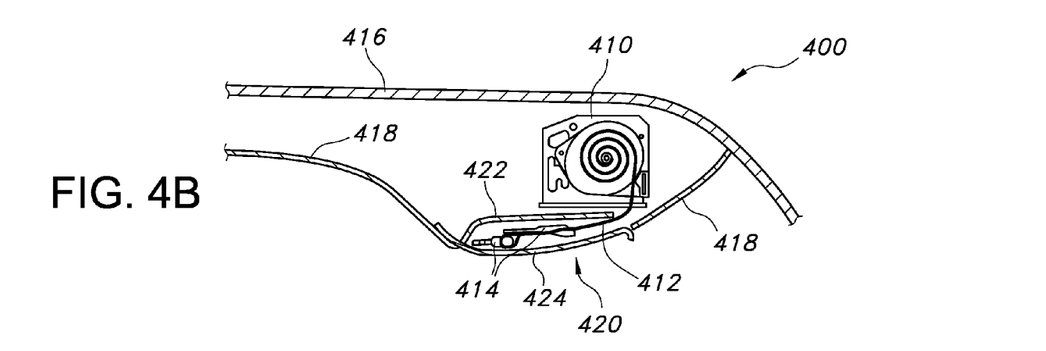
FIG. 4B depicts the compartment of FIG. 4A with the safety belt webbing and tongue/latch plate stowed and the door in a closed configuration.
Figure 4C:
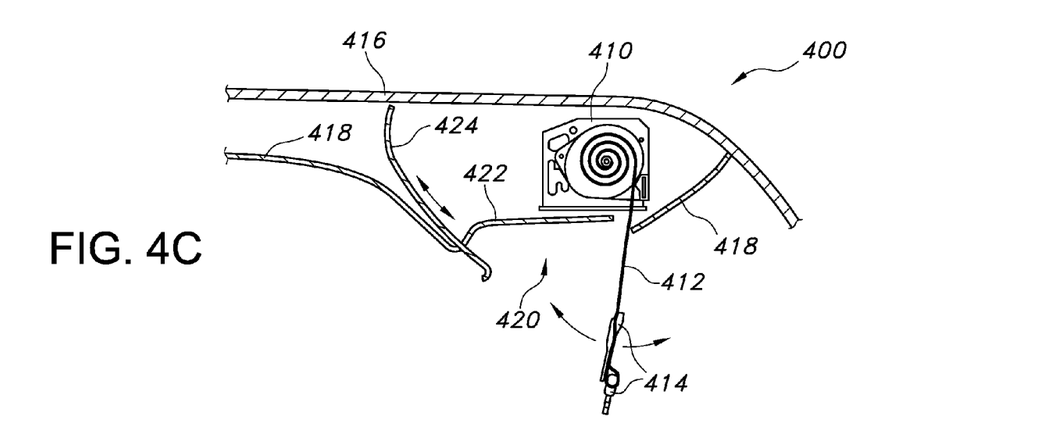
FIG. 4C depicts the compartment of FIG. 4A with the safety belt webbing and tongue/latch plate deployed and the door in an open configuration.
Figure 5A:
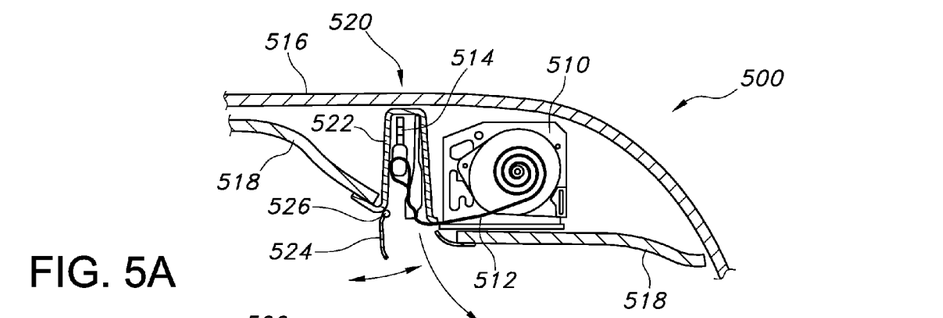
FIG. 5A depicts a side view of still another alternative embodiment of a roof-mount safety belt stowage compartment according to the present disclosure with the safety belt webbing and tongue/latch plate stowed and the door in an open configuration.
Figure 5B:
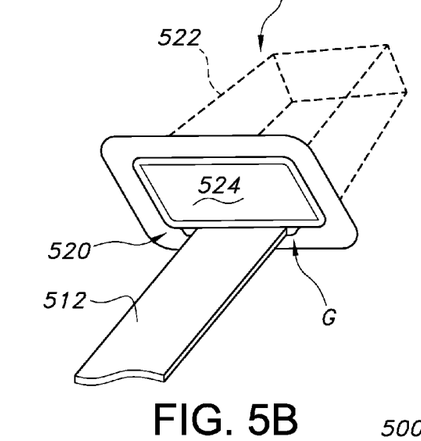
FIG. 5B depicts a front perspective view of the compartment of FIG. 5A with the safety belt webbing and tongue/latch plate deployed and the door in a closed configuration.
Figure 5C:
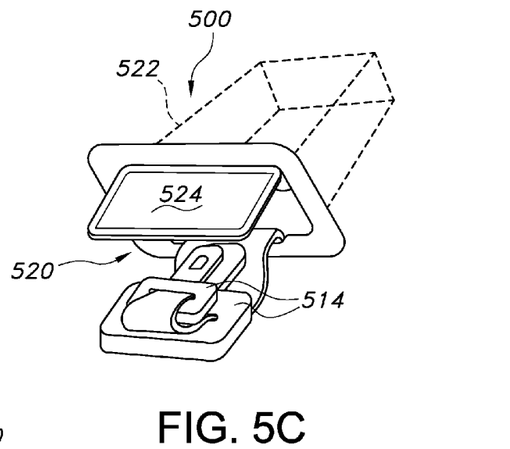
FIG. 5C depicts the compartment of FIG. 5A with the safety belt webbing and tongue/latch plate deploying and the door in an open configuration.
Figure 5D:
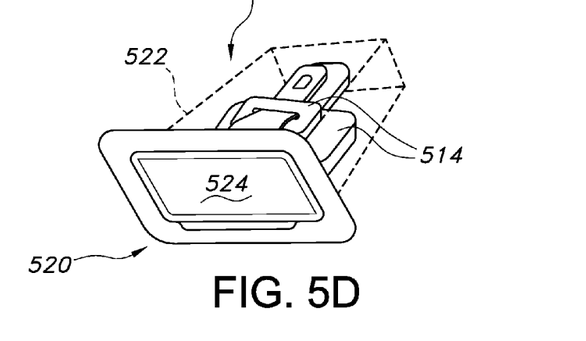
FIG. 5D depicts the compartment of FIG. 5A with the safety belt webbing and tongue/latch plate stowed and the door in a closed configuration.

In yet another embodiment of a roof-mounted assembly 400 (see FIGS. 4A-4C), on reaching a limit of retraction of retractor 410, tongue/latch plate 414 and a portion of webbing 412 may be swung forwardly and upwardly into pocket 420, and door 424 may be closed. Various mechanisms for retaining tongue/latch plate 414 in pocket 420 are contemplated as described above, including retainers, magnetized retainers, etc. associated with one or both of tongue/latch plate 414 and wall 422.

In still yet another embodiment of a roof-mounted assembly 500 (see FIGS. 5A-5D), on reaching a limit of retraction of retractor 510, tongue/latch plate 514 and a portion of webbing 512 may be swung forwardly and upwardly into pocket 520, and door 524 may be closed. Various mechanisms for retaining tongue/latch plate 514 in pocket 520 are contemplated as described above, including retainers, magnetized retainers, etc. Likewise, dampers and spring-assisted mechanisms are contemplated for door hinge 526 as described above. Still more, door 524 may be provided with a catch or lock for retaining in the closed configuration as described above.

In still yet another embodiment, a parcel-tray mounted safety belt tongue/latch plate stowage pocket is provided. As is known, the parcel tray of a vehicle is conventionally a flat surface disposed behind a second or third row seat and adjacent to a rear window, such as in a sedan or limousine.

In one embodiment (see FIGS. 6A-6C), substantially as described above the parcel tray-mounted assembly 600 includes a seat belt webbing retractor 610 for deploying and retracting a seat belt webbing 612 and tongue/latch plate 614. As shown, the retractor 610 is disposed below a portion of a parcel tray trim 628 and behind a vehicle seat S.

Figure 6A:
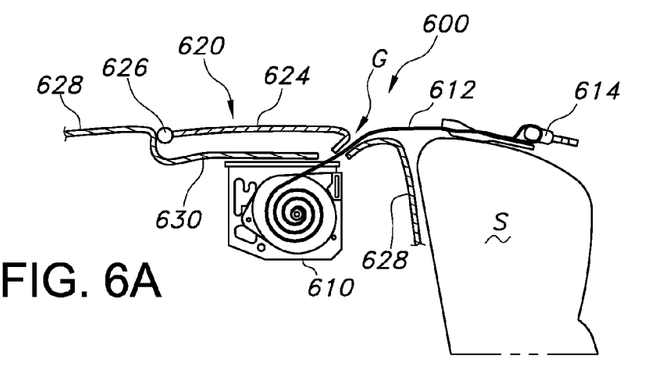
FIG. 6A depicts a side view of a parcel tray-mounted safety belt stowage compartment according to the present disclosure having a door held in a closed configuration and showing the safety belt webbing and tongue/latch plate deployed.
Figure 6B:
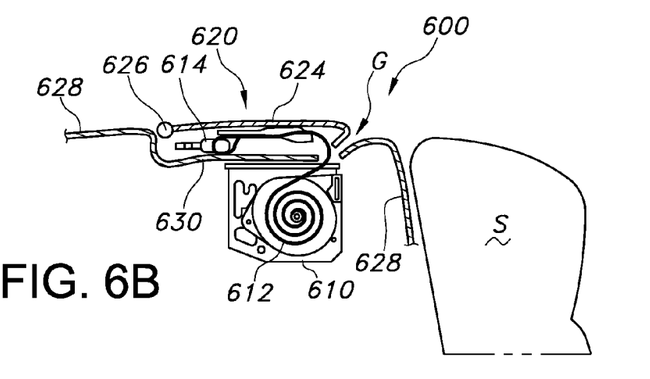
FIG. 6B depicts the compartment of FIG. 6A with the door in a closed configuration and the safety belt webbing and tongue/latch plate stowed.

The assembly 600 further includes a safety belt tongue/latch plate stowage pocket 620, defined by a floor 630 and a door 624. As shown, floor 630 is provided by a portion of the vehicle parcel tray trim 628, although of course a separate structure could be provided as floor 630. As shown, door 624 is configured for pivoting between an open configuration (FIG. 6C) and a closed configuration (FIG. 6B). An intermediate configuration is provided wherein a gap G is provided between the door 624 and the floor 630. As described above, this allows deployment of the safety belt webbing 612 and tongue/latch plate 614 during use (FIG. 6C) while maintaining an appearance of a closed door 624, providing a more attractive aesthetic appearance than conventional roof-mount mechanisms which typically expose the inner mechanisms thereof.

Figure 6C:
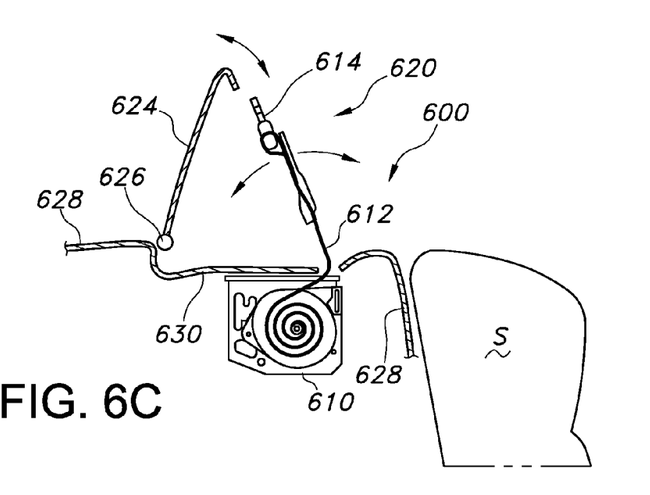
FIG. 6C depicts the compartment of FIG. 6A with the door in an open configuration.

In the depicted embodiment, door 624 is pivotally mounted for translating between the open and closed configurations by a hinge 626, as discussed supra optionally having a spring mechanism for assisting in translating the door between the open and closed configurations and a damper. As shown in FIGS. 6A-6C, door 624 may pivot in a rearward direction relative to the vehicle longitudinal axis. As shown, on reaching a limit of retraction of retractor 610, tongue/latch plate 614 and a portion of webbing 612 are simply folded backwardly into pocket 620, and door 624 may be closed. Again, dampers and spring-assisted mechanisms are contemplated for door hinge 626 as described above. Still more, door 624 may be provided with a catch or lock for retaining in the closed configuration as described above.

Figure 7A:
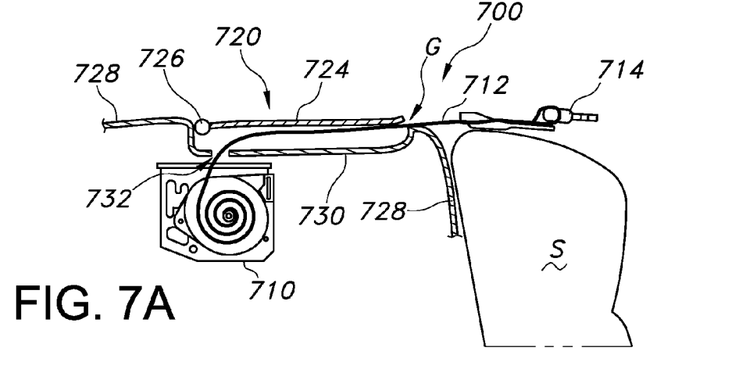
FIG. 7A depicts side view of an alternative embodiment of a parcel tray-mounted safety belt stowage compartment according to the present disclosure having a door held in a closed configuration and showing the safety belt webbing and tongue/latch plate deployed.
Figure 7B:
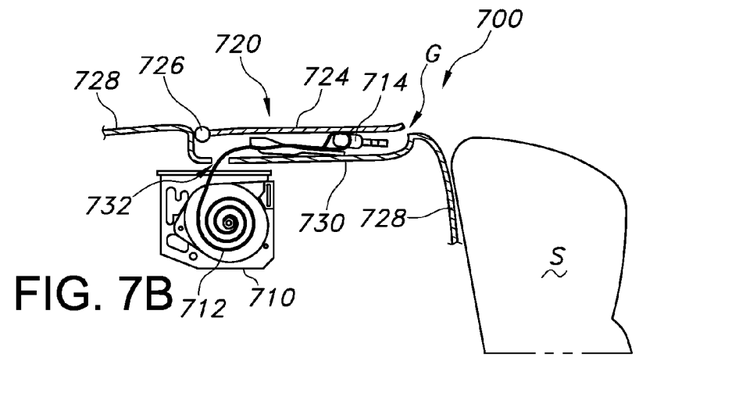
FIG. 7B depicts the compartment of FIG. 7A with the door in a closed configuration and the safety belt webbing and tongue/latch plate stowed.
Figure 7C:
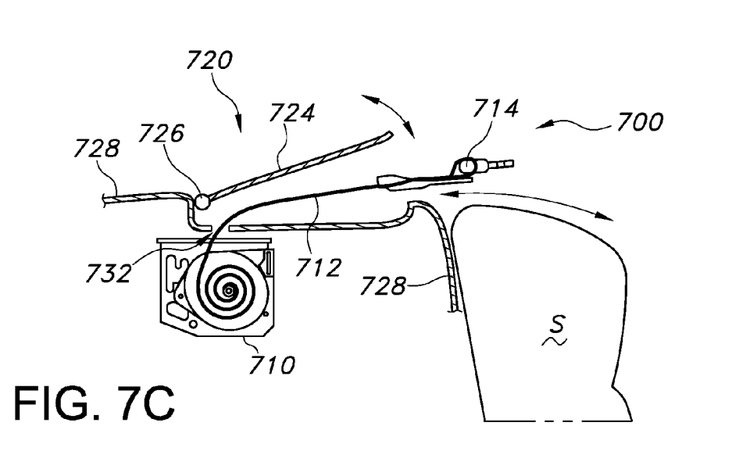
FIG. 7C depicts the compartment of FIG. 7A with the door in an open configuration.

In an alternative embodiment of a parcel tray-mounted safety belt tongue/latch plate stowage assembly 700 (see FIGS. 7A-7C), having features substantially similar to those described for the assembly of FIGS. 6A-6C, floor 730 may include an aperture 732 configured to receive webbing 712 therethrough. As shown in FIG. 7B, on reaching a limit of retraction of retractor 710, tongue/latch plate 714 and a portion of webbing 712 are fully retracted into pocket 720, and door 724 may be closed.

Obvious modifications and variations are possible in light of the above teachings. For example, in addition to or alternatively to the foregoing spring-assist mechanisms and dampers, the stowage compartment pocket doors may be provided with motorized mechanisms for opening/closing, such motorized mechanisms being known in the art. In yet other alternative embodiments, sensors may be disposed adjacent to the tongue/latch plate stowage pockets for detection of safety belt tongue/latch plate, which on detection of the latch plate open the pocket door, and on stowage of the latch plate close the pocket door. In turn, alternative embodiments are contemplated wherein the stowage pocket may include a suitable light source (as non-limiting examples an incandescent bulb, LED, EL, and others) that illuminate the inside of the stowage pocket for improved visibility of the pocket and the safety belt tongue/latch plate stored within. When coupled with aforementioned sensors, the stowage pocket may be illuminated within upon detection of the safety belt tongue/latch plate. Furthermore, the stowage pocket may turn-on the illumination as the stowage bin door opens, and may turn-off the illumination as the stowage pocket door closes. Mechanisms for accomplishing such illumination, for example pressure switches associated with the light source, are known in the art.

Still further, while roof- and parcel tray-mounted embodiments are shown and described, the skilled artisan will appreciate that the described assemblies are readily modified to provide vehicle pillar-mounted assemblies. All such modifications and variations are within the scope of the appended claims when interpreted in accordance with the breadth to which they are fairly, legally and equitably entitled.

What is claimed:

1. A concealing stowage compartment for a vehicle safety belt tongue/latch plate, comprising a pocket configured for receiving the safety belt tongue/latch plate therein, the pocket defined by at least a wall and a door configured for translation between an open configuration and a closed configuration, wherein the door slides laterally between the open configuration and the closed configuration.

2. The compartment of claim 1, wherein the closed configuration defines a gap between the wall and the door sufficient for passage therethrough of a safety belt webbing.

3. The compartment of claim 2, wherein the door includes a catch for engaging the safety belt tongue/latch plate to translate the door to the closed configuration.

4. The compartment of claim 3, wherein the door includes a hinged end for pivoting between the open configuration and the closed configuration.

5. A vehicle including the compartment of claim 1.

6. A vehicle safety belt webbing and tongue/latch plate stowage assembly, comprising:
   a safety belt webbing retractor disposed in a compartment;
   a pocket disposed adjacent to the compartment and configured for receiving the safety belt tongue/latch plate therein, the pocket defined by at least a divider and a door configured for translation between open configuration and a closed configuration, wherein the door slides laterally between the open configuration and the closed configuration.

7. The assembly of claim 6, wherein the closed configuration defines a gap between the wall and the door sufficient for passage therethrough of a safety belt webbing.

8. The assembly of claim 7, wherein the door includes a catch for engaging the safety belt tongue/latch plate to translate the door to the closed configuration.

9. The assembly of claim 8, wherein the door includes a hinged end for pivoting between the open configuration and the closed configuration.

10. The assembly of claim 6, wherein the compartment is disposed in a portion of a roof trim of the vehicle.

11. The assembly of claim 6, wherein the compartment is disposed in a portion of a parcel tray of the vehicle.

12. A vehicle including the assembly of claim 6.

* * * * *